United States Patent
Eden et al.

(10) Patent No.: US 6,882,951 B2
(45) Date of Patent: Apr. 19, 2005

(54) METHOD AND SYSTEM FOR INFORMATION HANDLING SYSTEM AUTOMATED AND DISTRIBUTED TEST

(75) Inventors: Matthew Eden, Austin, TX (US); Jeremy Campbell, Austin, TX (US); Sherman Quick, Pflugerville, TX (US); Matthew Selman, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 45 days.

(21) Appl. No.: 10/614,762

(22) Filed: Jul. 7, 2003

(65) Prior Publication Data

US 2005/0021274 A1 Jan. 27, 2005

(51) Int. Cl.⁷ .............................................. G06F 19/00
(52) U.S. Cl. .................................. 702/121; 455/67.11
(58) Field of Search ........................ 702/121, 182–185; 455/423, 67.11; 707/100

(56) References Cited

U.S. PATENT DOCUMENTS

| | | | |
|---|---|---|---|
| 6,014,760 A | 1/2000 | Silva et al. ................... 714/46 |
| 6,163,805 A | 12/2000 | Silva et al. .................. 709/227 |
| 6,167,537 A | 12/2000 | Silva et al. ................... 714/46 |
| 6,272,536 B1 | 8/2001 | van Hoff et al. ............. 709/217 |
| 6,360,268 B1 | 3/2002 | Silva et al. .................. 709/227 |
| 6,418,298 B1 | 7/2002 | Sonnenfeld ................. 434/350 |
| 6,460,068 B1 | 10/2002 | Novaes ....................... 709/102 |
| 6,567,767 B1 * | 5/2003 | Mackey et al. ............. 702/186 |
| 6,779,134 B1 * | 8/2004 | Laviolette et al. ............ 714/38 |
| 2003/0046029 A1 * | 3/2003 | Wiener et al. .............. 702/186 |
| 2003/0120971 A1 * | 6/2003 | Christie ....................... 714/25 |
| 2003/0163802 A1 * | 8/2003 | Takahashi .................... 717/136 |
| 2003/0167426 A1 * | 9/2003 | Slobodnik ................... 714/718 |
| 2004/0015864 A1 * | 1/2004 | Boucher ..................... 717/124 |

* cited by examiner

Primary Examiner—Edward Raymond
(74) Attorney, Agent, or Firm—Hamilton & Terrile LLP; Robert W. Holland

(57) ABSTRACT

A system and method for testing information handling systems distributes test units across a network to communicate with a test server. The test server communicates test executables and runtimes to the test units according to scripts of a script package, test engines associated with the test server and a test unit profile. To load and execute an executable and runtime on a test unit, a test controller associated with the test server sends an execution identifier to a test unit process abstraction layer controller. A validator of the test unit controller responds to the execution identifier with test unit configuration profile information that the test server controller applies to one or more test engines and a script to generate an executable and runtime that is sent to the test unit controller. An activator of the test unit process abstraction layer controller activates the executable scripts through the runtime and tracks test results. The test unit process abstraction layer controller provides improved stability during test unit failures and remote control of runtime functions, such as dynamic runtime duration, pause and abort functionality.

9 Claims, 2 Drawing Sheets

METHOD AND SYSTEM FOR INFORMATION HANDLING SYSTEM AUTOMATED AND DISTRIBUTED TEST

BACKGROUND OF THE INVENTION

1. Field of the Invention

The present invention relates in general to the field of testing information handling systems, and more particularly to a method and system for automated and distributed information handling system test.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The wide variety of hardware and software components available for use in information handling systems often presents manufacturers of information handling systems with a substantial challenge in ensuring the compatibility of components assembled in given information handling system configurations. As new or upgraded components become available, manufacturers typically test the interoperability of the components with existing components to confirm correct operations of information handling systems before commercial manufacture of the systems. For instance, tester software engines create test executables that operate on test information handling systems either directly or through an associated runtime to ensure compatibility of components, such as with repeated performance of common operations. These test executables often operate on individual test information handling systems through test engine specific runtimes, such as runtimes operating in Java, Visual Basic, Rational Visual Test, Win-Runner and Silk Test.

Although conventional information handling system testing engines are generally collectively able to confirm an information handling system configuration's proper operation, each testing engine typically has proprietary interfaces for managing, storing and executing individual tests on targeted systems so that the benefits of the various test automation platforms are not available for unified use. Thus, existing testing engines generally do not interact so that a given test for a given testing engine generally is not leveraged across different testing organizations or in different testing platforms. The lack of integration across testing engines makes the compilation and tracking of test data more difficult and reduces the ability to leverage test findings against overall test plan metrics, such as the execution of a test executable for a variety of testing engines on the same or similar test information handling systems. Test engineers face a substantial challenge in running appropriate tests and maintaining test executables and runtimes operating with current revisions. Thus, scripts for testing given information handling system configurations often are not reusable for the validation of other configurations. Further, scripts are run on individual information handling systems, not simultaneously. In the event of errors, the information handling system and test runtimes typically are incapable of recovery, instead requiring test engineer interaction to reinitiate test operations.

SUMMARY OF THE INVENTION

Therefore a need has arisen for a method and system which coordinates test executables and runtimes for plural test engines at distributed test information handling systems.

A further need exists for a method and system which integrates test scripts and test results of plural test engines for testing diverse information handling system configurations.

A further need exists for a method and system which provides error recovery for test executables that fail on a test information handling system.

In accordance with the present invention, a method and system are provided which substantially reduce the disadvantages and problems associated with previous methods and systems for testing information handling systems. Tiered application, service and database layers coordinate diverse test engines, test scripts and test unit profiles to provide a unified test system and method for information handling systems.

More specifically, a test server applies test scripts and test unit profiles to test engines to generate test executables for execution on the test units either directly or with an associated runtime. The test server coordinates communication of test executables to test unit process abstraction layer controllers and the return of results from the execution of the test executables on the test units. Script packages and results for test engines that have different types of interfaces, communication protocols and results storage are unified for application across different types of test units and for reuse in different test programs. A test executable for a test unit is generated by sending an execution identifier from the test server to a validator of the process abstraction layer controller. The validator responds to the execution identifier with profile information for the test unit, which the test server applies to one or more scripts of a script package associated with the execution identifier and one or more test engines associated with the scripts to generate a test executable for execution on the test unit and, where appropriate a runtime associated with the test executable. The test executable and runtime are sent from the test server to the test unit for activation by an activator. The use of the validator and activator in a process abstraction layer controller supports dynamic runtime control from the test server for recovery of test unit failures and improved stability, as well as pausing and aborting test executable runtimes.

The present invention provides a number of important technical advantages. One example of an important technical advantage is that providing test unit executables and runtimes from a centralized test controller allows coordination of testing with plural test engines at distributed test information handling systems. A three tier design provides an application layer that coordinates creation of scripts and associated runtimes for different types of configurations, a service layer that applies and communicates test information and functions, and a database layer that allows centralized access of scripts for test design and for results storage and analysis.

Another example of an important technical advantage of the present invention is that a centralized test controller integrates test scripts and test results of plural test engines for testing diverse information handling system configurations. The application layer, service layer and database layer tiers provide integration of scripts and test engines for a unified testing methodology with results of testing available for analysis independent of the test engine that generated the test executable and runtime. For instance, test metrics such as test unit platform type, operating system, hardware information, language, date/time and pass/fail status, are made available through a test server platform that manages test engine proprietary interfaces for managing, storing and executing runtime tests. As another example, scripts are interchangeable through the test server platform for use in a variety of test platforms and with different test engines.

Another example of an important technical advantage of the present invention is that distributed test unit controllers provide error recovery for test runtimes that fail on a test information handling system. A process abstraction layer test controller improves test unit stability by allowing recovery from unit failures and by accepting communications from the test server platform that are independent of operating test runtimes. Further, the process abstraction layer supports simultaneous operation of plural test executables and runtimes on a test unit to permit more rapid testing with reduced time spent on test execution.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A unified approach to information handling system test is provided with a three tiered application, service and storage system that coordinates execution of test executables and runtimes on information handling system test units. For purposes of this application, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
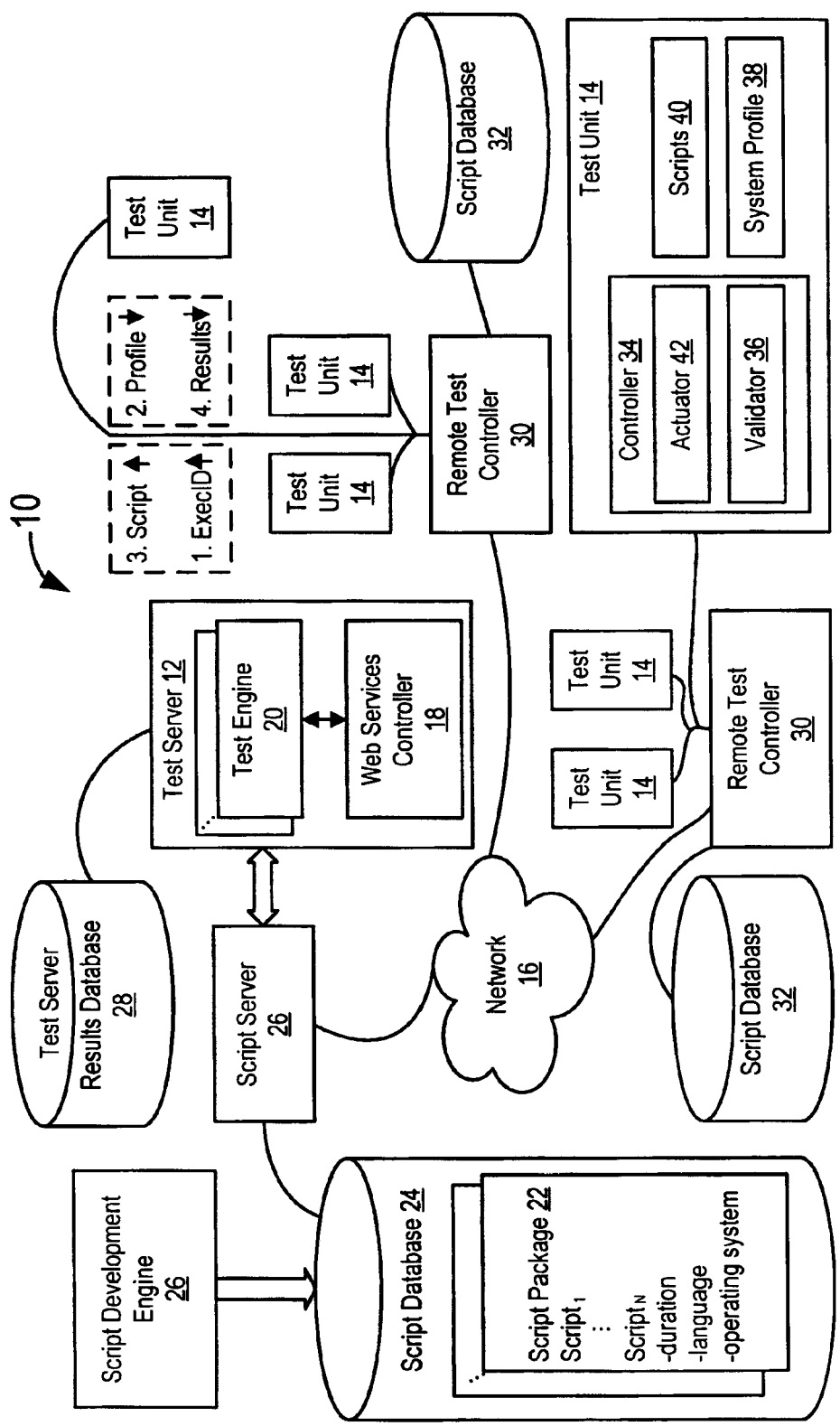
FIG. 1 depicts a block diagram of a system for information handling system test.

Referring now to FIG. 1, a block diagram depicts an information handling system test system 10 that coordinates through a test server 12 the execution of test executables and associated runtimes on information handling system test units 14 communicated through a network 16. Test server 12 creates test executables to test selected test units 14 with a test server web services controller 18 that applies configuration profile information for the selected test units to one or more test engines 20. Test server web services controller 18 creates the test executables and, where necessary, associated runtimes according to scripts of a selected script package 22 retrieved from a script database 24 through a script server 26. Script packages 22 are designed at a script development engine 26 to have scripts that define test executables for direct execution or execution with an associated runtime, including test parameters such as duration, language, operating system and other desired factors. For instance, a script package 22 may include plural scripts with the included scripts creating test executables for operation with runtimes from different test engines 20, such as Rational Visual Test, WinRunner and Silk Test, or in different languages for use in test engines 20, such as Java and Visual Basic. Results from test executables executed on test units 14 are saved in a test server database 28 indexed by script, test unit profile, test engine, operating system, hardware information, language, date/time, pass/fail status, and other desired factors. Communication across network 16 is coordinated through test server 12 with standardized protocols, such as SOAP and FTP, so that script package development, runtime execution and results analysis are available in a unified approach.

Test executable and runtime execution is coordinated through network 16 either directly from test server 12 or through remote test controllers 30 that aid in distributed test execution, control and results tracking with a remote script database 32. In one embodiment, remote script databases 32 are file servers that provide scripts identified by web services controller 18 to reduce the amount of data sent over network 16. A test on a test unit 14 is initiated by sending an execution identifier from test server web services controller 18 to the test unit 14. The execution identifier is associated with a script package 22 that is selected for execution with associated runtimes on the test unit 14. Test unit 14 handles runtime management and execution in a test unit controller 34, which operates as a process abstraction layer that separates runtime execution from network communications. A validator 36 responds to test server web services controller 18 by returning the execution identifier along with system profile information 38, such as the hardware and software configuration of the test unit 14. Test server web services controller 18 applies the system profile 38 to scripts of the selected script package 22 and test engines 20 associated with the scripts to generate executable scripts 40 and associated runtimes that are downloaded to the test unit 14. An actuator 42 of the test unit process abstraction layer controller 34 actuates the scripts 40 to perform the runtimes on the test unit 14. Because process abstraction layer controller 34 separates test runtimes from network communications, failures at test unit 14 do not disrupt network communications at the process abstraction layer so that remote recovery and control of runtimes is supported. For instance, test server controller 18 may pause or abort a runtime with an appropriate command through actuator 42 or may update a runtime by downloading updated scripts 40 through validator 36 during execution of the runtime. Further, the use of a process abstraction layer supports simultaneous operation of plural runtimes on a test unit.

Figure 2:
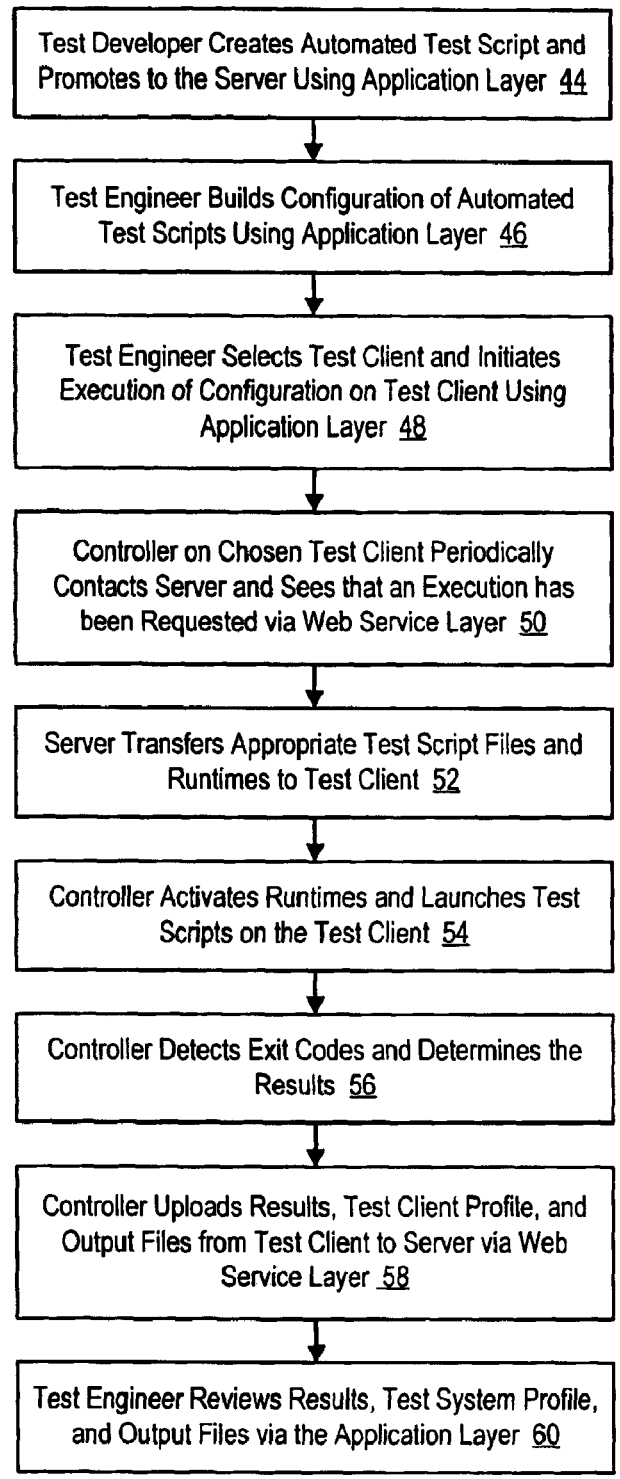
FIG. 2 depicts a flow diagram of a test runtime generation and execution.

Referring now to FIG. 2, a flow diagram depicts the process across the application, service and data layers for execution of runtimes on test units 14 that are generated at test server 12. The process begins in the application layer at step 44 with the development of automated test scripts and, at step 46, the configuration of the automated test scripts into a test configuration for generation of a test executable. At step 48, a test unit client is selected to run the test configuration by communication through the application layer of a test execution identifier to the selected test unit client from the test server. At step 50, the validator of the test unit client controller detects the test execution request by periodic contact through the service layer with the test server and sends the configuration profile information for the test unit to the test server. At step 52, the test server controller generates runtime scripts for execution on the test client by applying the profile information to a test engine. The test server analyzes the profile information to generate executables and runtimes for the test unit and sends the runtime scripts to the test unit. At step 54, the actuator of the test client actuates the runtime and launches test scripts for execution at the test unit. The runtime executes subject to control by the actuator, such as with dynamic runtime commands received from the test server, until detection of an exit code at step 56. Upon detection of the exit code, the process abstraction layer controller determines the results of the test scripts, obliterates the runtime script files and, at step 58, uploads the results, test client profile and output files from the test client to the test server for storage at the data layer. At step 60, the test results are available for review through the communication by the application layer with the data layer by search of test parameters, such as test system profile, script identifier, test type or other factors.

Although the present invention has been described in detail, it should be understood that various changes, substitutions and alterations can be made hereto without departing from the spirit and scope of the invention as defined by the appended claims.

What is claimed is:

1. A method for performing runtime tests on test information handling systems, the method comprising:

sending an execute identifier from a test server to one or more test units, the execute identifier associated with a script package having plural scripts;

responding to the execute identifier from the test unit to the test server with a test unit profile;

generating at the test server one or more test executables and runtimes to execute one or more scripts of the script package by applying the test unit profile to one or more test engines;

sending the test executables and runtime from the test server to the test unit; and executing the test executable and runtime on the test unit.

2. The method of claim 1 further comprising communicating between the test server and the test units with an intermediate remote test controller.

3. The method of claim 1 further comprising:

tracking results of the test executable on the test unit; and periodically communicating the results to the test server.

4. The method of claim 1 wherein generating at the test server one or more executables and runtimes further comprises:

selecting a script by comparing the test unit profile with script parameters; and generating a runtime for executing the script with a one of plural test engines, the test engine associated with the script.

5. The method of claim 1 wherein executing further comprises:

controlling communication with the test unit through a test unit controller process abstraction layer having an activator and a validator;

validating downloaded scripts with the validator; and activating a runtime and script with the activator.

6. The method of claim 5 wherein the test unit controller accepts dynamic runtime commands from the test server and the activator executes the dynamic runtime commands.

7. The method of claim 6 wherein the dynamic runtime commands comprise a dynamic script duration.

8. The method of claim 6 wherein the dynamic runtime commands comprise a pause command.

9. The method of claim 6 wherein the dynamic runtime commands comprise an abort command.

* * * * *